United States Patent [19]
Kim et al.

[11] Patent Number: 5,748,414
[45] Date of Patent: May 5, 1998

[54] MAGNETORESISTIVE ELEMENT ASSEMBLY WITH LONGITUDINAL BIAS

[75] Inventors: In Eung Kim, Seoul; A. M. Choukh, Kyunggi-do, both of Rep. of Korea

[73] Assignee: Samsung Electro-Mechanics Co., Ltd., Kyonggi-do, Rep. of Korea

[21] Appl. No.: 685,084

[22] Filed: Jul. 23, 1996

Related U.S. Application Data

[63] Continuation-in-part of Ser. No. 366,082, Dec. 29, 1994.

[30] Foreign Application Priority Data

Jun. 24, 1994 [KR] Rep. of Korea .................. 94/14597

[51] Int. Cl.$^6$ .................................................. G11B 5/39
[52] U.S. Cl. .................................................. 360/113
[58] Field of Search .................................................. 360/113

[56] References Cited

U.S. PATENT DOCUMENTS

| | | | |
|---|---|---|---|
| 4,219,854 | 8/1980 | Church et al. | 360/123 |
| 4,277,808 | 7/1981 | Nagaki | 360/113 |
| 5,164,869 | 11/1992 | Fontana, Jr. et al. | 360/113 |
| 5,184,267 | 2/1993 | Mallary | 360/126 |

FOREIGN PATENT DOCUMENTS

| | | | |
|---|---|---|---|
| 61-39916 | 2/1986 | Japan | 360/113 |

OTHER PUBLICATIONS

Mallary et al., "A New Thin Film Head which Doubles the Flux through the Coil", *IEEE Transactions on Magnetics* 29, No. 3832–3836 (1993).

*Primary Examiner*—A. J. Heinz
*Attorney, Agent, or Firm*—Seidel, Gonda, Lavorgna and Monaco, PC

[57] ABSTRACT

A magnetoresistive (MR) element assembly with a longitudinal bias comprising a MR element, a bias coil, and spaced conductor leads is disclosed. The MR element is formed into an elongated ellipse-like shape with an elongated sense region and two end regions separated by a small nonmagnetic gap thereby reducing the longitudinal demagnetization field within the MR element. An easy axis of magnetization is formed by the MR element and oriented in a direction parallel to the main axis of the element. A bias coil is disposed about the MR element to produce a longitudinal bias field sufficient to maintain the elongated sense region in a single domain state. The elongated ellipse-like shaped MR element features a uniformly reduced demagnetization field for inhibiting the formation of a multi-domain state within the elongated sense region. The MR element assembly thus improves sensitivity of the MR head and suppresses Barkhausen noise in the output of the head.

3 Claims, 2 Drawing Sheets ns with an
MAGNETORESISTIVE ELEMENT ASSEMBLY WITH LONGITUDINAL BIAS

CROSS-REFERENCE TO RELATED APPLICATIONS

This is a continuation-in-part of co-pending application Ser. No. 08/366,082, filed Dec. 29, 1994. The disclosure of application Ser. No. 08/366,082 is incorporated herein by reference.

FIELD OF THE INVENTION

The present invention relates in general to a magnetoresistive (MR) element used in a thin film MR head of a magnetic recording and reproducing apparatus. In particular, the present invention relates to a structural improvement in a MR element by forming the MR element into an elongated ellipse-like shape having a gap to closely approximate a magnetically closed circuit.

BACKGROUND OF THE INVENTION

In the past magnetic recording and reproducing apparatus employed magnetic heads having conventional bulk magnetic structures such as ferrite core heads and Metal-In-Gap (MIG) heads. However, bulk magnetic heads have relatively low magnetic densities resulting in inefficient data recording and reproduction. In accordance with the recent trends favoring high magnetic recording density and highly efficient data recording and reproduction, magnetic heads having thin film magnetoresistive (MR) elements have replaced conventional bulk heads.

Magnetic heads having thin film magnetoresistive (MR) elements have excellent reproducing efficiency and are widely used in recording and reproducing equipment. The typical MR element, however, generates an unwanted reproducing noise known as Barkhausen noise. Such noise is caused by a multi-domain structure associated with MR elements.

U.S. Pat. No. 4,663,685 discloses an MR reproducing head in which the MR element is longitudinally biased at its end regions by an exchange bias. This exchange bias is produced by a thin film of antiferromagnetic material deposited in direct contact with end regions of the MR element. The longitudinal bias is of a level sufficient to maintain the end regions of the MR element in a single domain state and thereby induce a single domain state in a central region of the MR element. Spaced conductive elements connect to the MR element within the central region to define a detection region, thus producing a transverse bias within the central region of the MR element of a level sufficient to maintain that region of the MR element in a linear response mode. Although the MR reproducing head reduces the Barkhausen noise, it increases the anisotropic magnetic field of the MR element causing reduced sensitivity and increased reproduction problems within the head.

U.S. Pat. No. 5,159,511 discloses a recording and reproducing head comprising an MR element and a conductor for producing a longitudinal magnetic bias field along the MR element. The conductor is arranged to produce a transverse magnetic bias field. The MR element is I-shaped and bias coils are disposed about the end regions of the MR element, thus maintaining the end regions of the head in a single domain state. This recording and reproducing head is intended to reduce Barkhausen noise and increase track density. However, this design also increases the anisotropic magnetic field of the MR element, resulting in reduced sensitivity and increased reproduction problems within the head.

SUMMARY OF THE INVENTION

The present invention is directed to a MR element assembly which overcomes the above-identified problems by improving operational efficiency and reducing unwanted reproduction Barkhausen noise. The MR element assembly in accordance with the present invention includes a MR element formed into an ellipse-like shape having a small magnetic gap defined between two end regions of the element. The MR element also includes a sense region in an elongated portion thereof. This configuration provides a MR element that is easily magnetized along its main or longitudinal axis. This axis is known as "an easy axis of magnetization," or, simply, "an easy axis."

A bias coil disposed about the MR element produces a longitudinal bias in the MR element of a level sufficient to maintain the sense region of the MR element in a single domain state thereby reducing the element's demagnetization field. The coil may be disposed about the MR element at any point other than within the elongated sense region. A pair of spaced conductor leads connect to the MR element within the elongated sense region and are separated from each other by the intervening gap.

In addition, a transverse bias is produced by the MR element assembly through a change of resistance within the sense region. The resistance is changed within the MR element as a function of the magnetic fields intercepted by the spaced conductor leads of the MR assembly.

The above and other aspects, features and advantages of the invention will be apparent from the following description of a preferred embodiment of the invention as illustrated in the accompanying drawings.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIGS. 1a and 1b are schematic views of typical prior art magnetoresistive (MR) elements, in which:

FIG. 1a shows a MR element having a pair of antiferromagnetic exchange patterns in its end regions; and FIG. 1b shows a MR element having a pair of biasing loops in its end regions.

DETAILED DESCRIPTION OF THE INVENTION

Figure 1A:
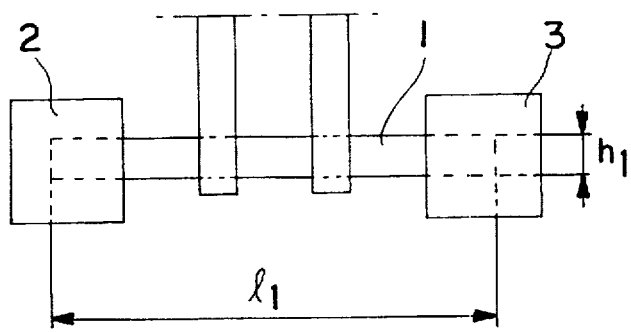
Figure 1B:
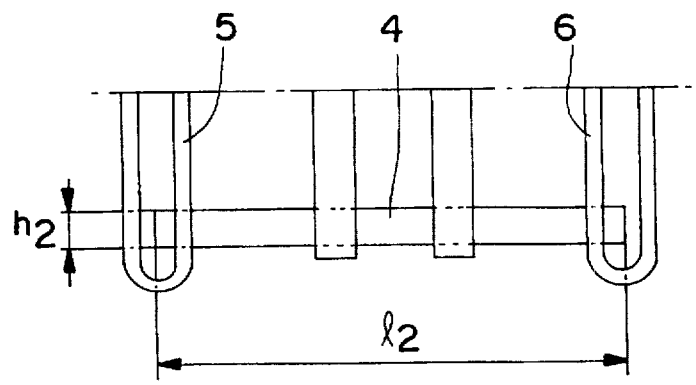

Referring now to the drawings, wherein like numerals indicate like elements, there is shown in FIGS. 1a and 1b typical magnetic head designs known in the prior art. FIG. 1a shows a magnetic head having a magnetoresistive (MR) element 1 arranged with a pair of antiferromagnetic exchange elements 2,3 at its end regions. FIG. 1b shows a magnetic head having a linear MR element 4 with a pair of longitudinal bias coils 5,6 disposed about its end regions.

Referring to FIG. 1, the thin film exchange elements 2,3 are made of FeMn alloy. The performance of the MR element 1 is known to deteriorate as the FeMn alloy elements 3,4 corrode, thereby reducing the operational efficiency of the entire magnetic head. In addition, this structure has an inherent limitation in its ability to reduce longitudinal demagnetization fields. In order to reduce the demagnetization fields, the ratio of the length $l_1$ to the width $h_1$ of the MR element 1 is increased. However, as the longitudinal demagnetization field in the MR element 1 is reduced by increasing the ratio of length to width, the cross-talk effect from adjacent tracks is increased.

In addition, the efficiency of the magnetic head shown in FIG. 1 decreases and Barkhausen noise increases with an increase in environment temperature. This is caused by a change in the exchange effect between the MR element 1 and the antiferromagnetic exchange elements 2,3.

Referring to FIG. 1b, the linear MR element 4 varies its magnetic field by biasing coil loops 5,6 which are disposed about the end regions of the linear MR element 4. The MR element 4, however, fails to desirably reduce the demagnetization field in the head because of a structural limit on increasing the ratio of the length $l_2$ to the width $h_2$ of the MR element 4 which is identical to the limitation described above for the MR element 1 of the head shown in FIG. 1a.

In addition, the MR element 4 of FIG 1b is a complicated design and difficult to manufacture. Thus, the production yield of MR heads encompassing such MR elements is relatively low. Furthermore, the efficiency of the MR element 4 gradually deteriorates because the MR element 4 is recessed by an air bearing surface formed about the MR head by the use of the biasing coil loops 5,6.

Figure 2:
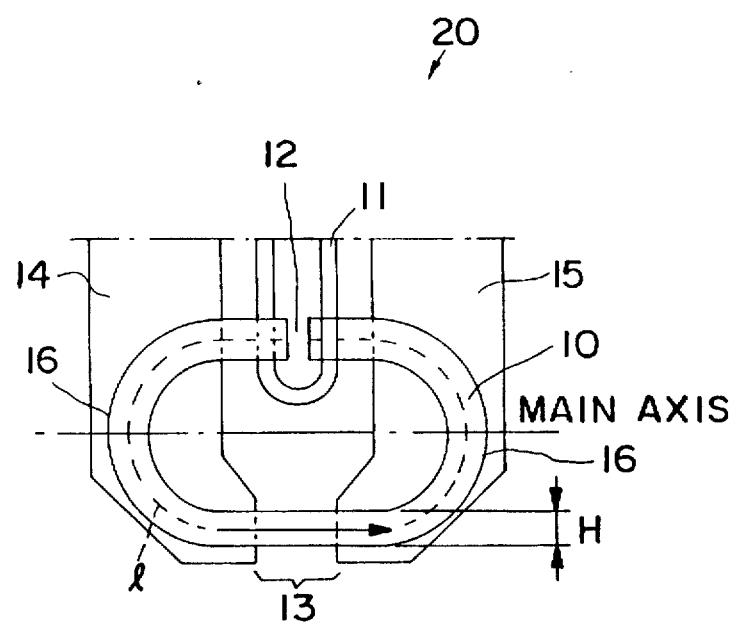
FIG. 2 is a schematic view of a MR element in accordance with a preferred embodiment of the present invention.

FIG. 2 shows a representation of a thin film magnetic head 20 having a magnetoresistive (MR) element 10 in accordance with a preferred embodiment of the invention. The MR element 10 is formed into an elongated ellipse-like shape having a circumferential length l, an elongated sense region 13, an element gap 12, and two end regions 16. The element gap 12 is located opposite the sense region 13, and said end regions 16 separated from each other by said element gap 12 placed therebetween. An easy axis of magnetization ($M_s$)of the MR element 10 is oriented in a direction parallel to the main axis of the elongated element 10. The magnetic head further includes conductor leads 14,15 through which an output signal is sensed. The leads 14,15 are in direct contact with the MR element 10 at its end regions and further define the elongated sense region 13.

This design provides a magnetic head with a MR element having the following advantages:

(1) a reduced demagnetization field Hd due to formation of the MR element into a magnetically closed circuit; and (2) a uniform demagnetization field Hd within the element due to formation of the MR element into an elongated ellipse-like shape having a gap.

The shape of the MR element 10 forms a magnetically closed circuit whereby the demagnetization field $H_d$ is considerably reduced. The value of the demagnetization field depends on the ratio of the length of the element gap 12 to the length of the MR element 10. The demagnetization field is therefore increased or decreased with a corresponding increase or decrease in this ratio. Therefore, the demagnetization field is minimized as the length of the MR element 10 is minimized. In one aspect of the present invention, an element gap 12 of about 0.5–2.0 μm is preferred.

The element gap 12 may be provided in any region of the MR element 10 with the exception of the elongated sense region 13. In a preferred embodiment, the location of the element gap 12 is along the elongated portion of the element 10 opposite the elongated sense region 13. In addition, cross-talk from adjacent tracks is reduced by action of the magnetically closed circuit further allowing reduction in the length of that portion of the MR element 10 adjacent to the magnetic media (not shown).

When formed into an elongated ellipse-like shape having a gap, the MR element 10 creates a uniformly distributed demagnetization field within the element 10. A uniform demagnetization field reduces the formation of edge domains which are responsible for the formation of undesirable multidomain structures in the sense region of traditional rectangular MR elements. It is well known that multidomain structures are the cause of Barkhausen noise during the reproduction process.

The elongated ellipse-like shaped design of the MR element 10 provides a quasistable single domain state in the sense region 13. However, this state can be deteriorated by the formation of a transverse magnetic field produced by an unstable single domain state. To stabilize the single domain state in the sense region 13, a longitudinal bias field should be applied to the MR element 10. To produce the necessary longitudinal bias field, a bias coil 11 is disposed about the MR element 10 except the sense region 13.

An additional feature of the ellipse-like shape MR element 10 is that a very small longitudinal bias field is required to stabilize the single domain state. In contrast, a large longitudinal bias field is required to stabilize the domain state produced by a traditional rectangular shaped MR element. Because a smaller longitudinal bias field can be applied to the MR element, its sensitivity during the reproduction process is greatly increased.

The conductor leads 14 and 15, through which the output signal is sensed, are deposited in direct contact with the MR element 10 within the elongated sense region 13. The gap 12 is preferably located between the conductor leads 14 and 15.

In addition to the longitudinal bias, the sense region 13 is further provided with a transverse bias in order to maintain the sense region in a linear response mode. The transverse bias can be provided by known methods (not shown) such as, but not limited to, shunt biasing, soft-film biasing, or permanent magnet biasing. The bias coil 11 can comprise any number of turns and can be disposed about any region of the MR element 10, except within the elongated sense region 13.

The MR element assembly 20 embodying the present invention can be fabricated by any suitable method known to those skilled in the art.

The present invention may be embodied in other specific forms without departing from the spirit or essential attributes thereof and, accordingly, reference should be made to the appended claims, rather than to the foregoing specification, as indicating the scope of the invention.

What is claimed is:

1. A magnetoresistive element assembly with longitudinal bias, said assembly comprising:

a magnetoresistive element formed into an elongated ellipse-like shape, said magnetoresistive element having a sense region, a gap, and two end regions, said end regions separated from each other by said gap placed therebetween;

a bias coil to produce a longitudinal bias in said magnetoresistive element of a level sufficient to maintain said sense region in a single domain state, said bias coil disposed about the magnetoresistive element except the sense region; and spaced conductor leads electrically connected to said magnetoresistive element within said sense region and separated from each other with said gap portion therebetween.

2. The magnetoresistive element assembly of claim 1, wherein an easy axis of magnetization of said magnetoresistive element is oriented in a direction parallel to an elongation of a main axis of said magnetoresistive element.

3. The magnetoresistive element assembly of claim 1, wherein said sense region is placed in an elongate portion of said magnetoresistive element.

* * * * *